Figure 5:
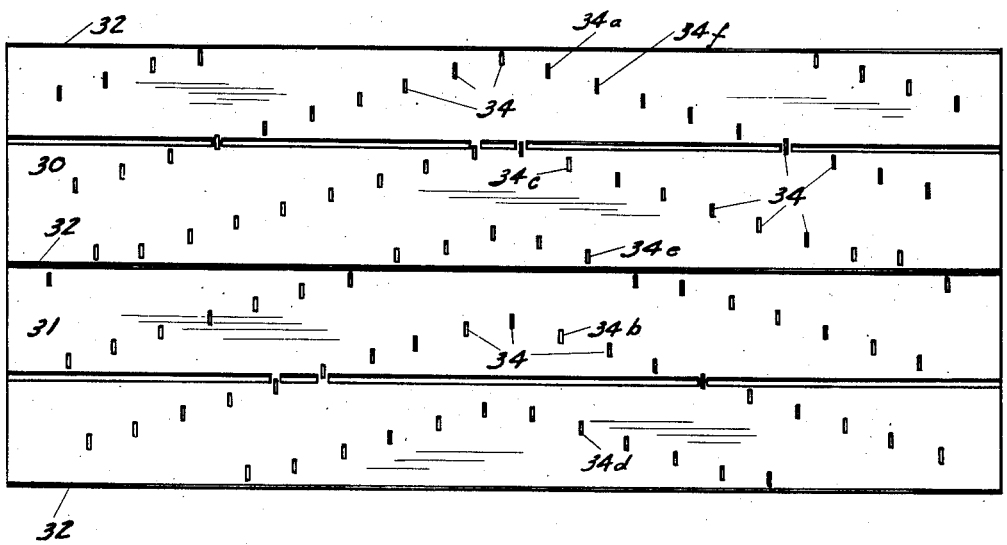

Feb. 7, 1933.  G. INNES  1,896,626
GRAIN PICK-UP MECHANISM
Filed Oct. 30, 1929   2 Sheets-Sheet 1
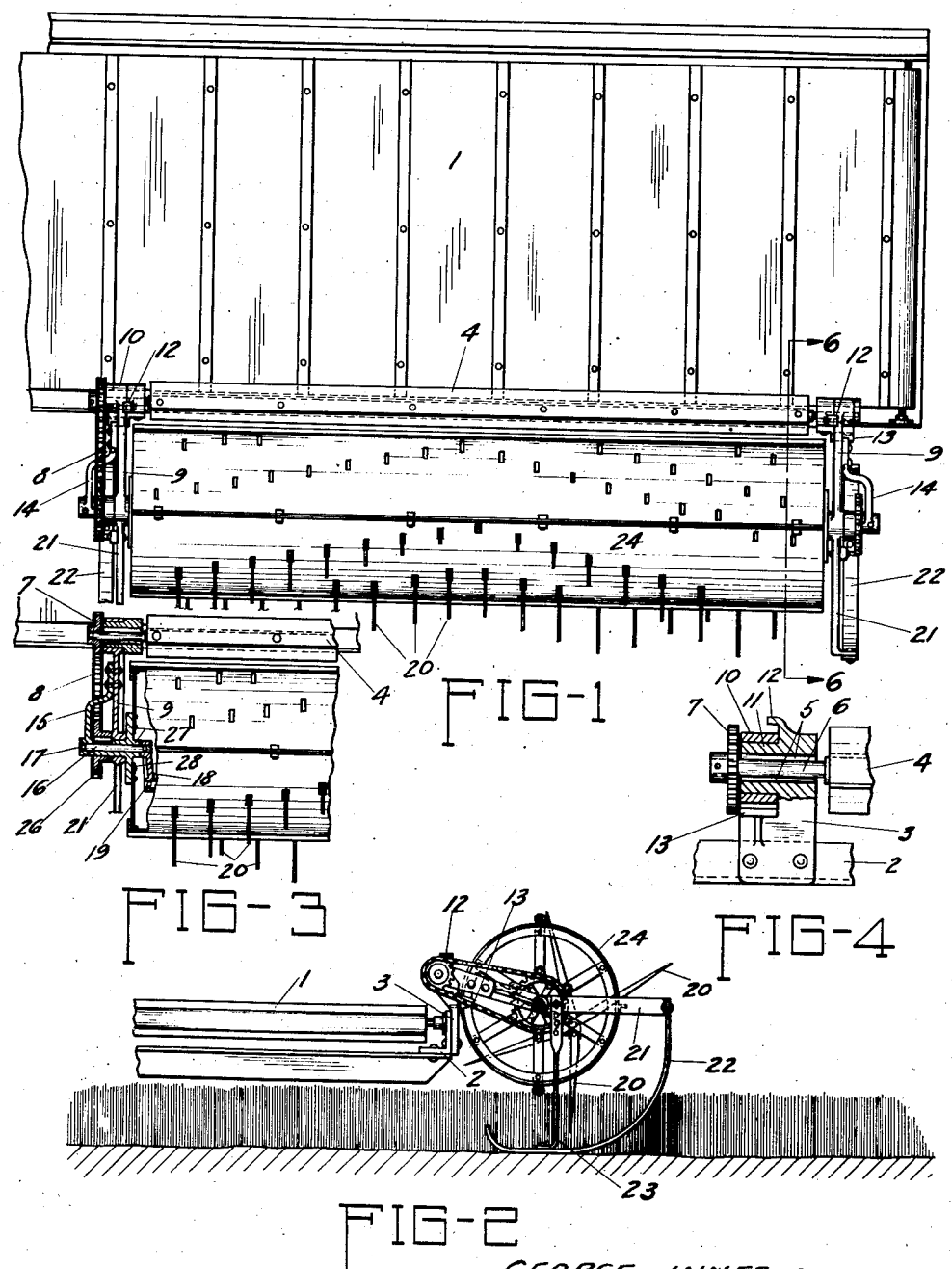
GEORGE INNES INVENTOR.
BY Merrill M. Blackburn
ATTORNEY Feb. 7, 1933.    G. INNES    1,896,626
GRAIN PICK-UP MECHANISM
Filed Oct. 30, 1929    2 Sheets-Sheet 2

GEORGE INNES INVENTOR.
BY
Merrill M. Blackburn
ATTORNEY

Patented Feb. 7, 1933

1,896,626

UNITED STATES PATENT OFFICE

GEORGE INNES, OF DAVENPORT, IOWA, ASSIGNOR TO INNES MANUFACTURING COMPANY, OF BETTENDORF, IOWA, A CORPORATION OF DELAWARE

GRAIN PICK-UP MECHANISM

Application filed October 30, 1929. Serial No. 403,451.

The present invention relates to mechanism for handling detached vegetable matter of a more or less fibrous nature, being designed more especially for use with grain shockers, combines, hay-loaders, hay rakes, cornstalk loaders, grain binders, threshing machines, and the like. It pertains to a mechanism for use in apparatus such as disclosed in my prior applications Serial Nos. 170,526 filed February 24, 1927, and 374,545 filed June 28, 1929, and to other somewhat similar devices.

In this specification and the appended claims, the term "grain" will, for the sake of brevity, be used in a broad sense to include not only grain in the ordinary sense, but also hay, cornstalks, sugar-cane, rice, and the like.

In the past, various methods and mechanisms have been used for picking up and handling grain and similar commodities, as specified above, but none of those prior to my construction have been entirely satisfactory, for one reason or another. For example, in some types of grain pickups the teeth of the pickup mechanism would strike obstacles, such as stones, and either pick them up and deliver them with the grain or, possibly, be injured by reason of the impact with the stones. The types of pickup that have had their teeth in line across the face of the pickup have carried stones into the thresher because, when they struck a stone, its general direction was directly forward and often landed on top of the windrow which then acted as a carrier to carry the stones into the threshing machines. The present machine has a tendency to throw the stones at an angle away from the windrow due to the non-aligned arrangement of the teeth when they strike the stone. In one type of construction, the teeth were carried on a belt, apron, or the like, traveling in such a direction that the rate of travel of the teeth, relatively to the ground and objects thereon, was equal to the sum of the rate of forward travel of the machine plus the rate of travel of the teeth themselves with relation to the machine. Also, as the belt or apron reached the forward part of its course of travel and turned around the front edge of the machine to start back on top to carry the grain with it, the ends of the teeth were traveling around in a substantially vertical circle and traveling at a rate considerably greater than the sum spoken of above. The result of this has been that these teeth would strike obstacles with a considerable impact resulting in the breaking or bending of the teeth and, possibly, injury to the machine as a whole. In the constructions of the prior art various provisions have been made for detaching the vegetation from the teeth of the mechanism that picks up and proposes to release the detached vegetation, such, for example, as tilting the teeth at or about the time they have reached the discharge position, or of using reverse raddles in connection with said tilting, or rollers or strips of metal inserted between the teeth thus attempting to remove the vegetation, but these efforts have been only partially successful and considerable grain has been lost by being carried along with the teeth or by being dropped into the mechanism carrying the teeth, there to clog the mechanism and often causing it to break. These all having failed to be as effective as might be desired, I have produced the present construction, in an effort to reduce grain losses and breakage of mechanism, as well as to produce a device that is more desirable in other respects than prior constructions. Furthermore the cam action which is employed, together with gears, in other constructions, for the tilting of the teeth, must again be employed to restore the teeth to an engaging position; this causes them to be moved unduly fast at the point of picking up the grain, thus tending to thresh the grain out of the hulls and cause loss thereof. The motion of the teeth at such time is made up of the following elements: The forward travel of the machine, the forward travel of the teeth with relation to the machine and the forward travel, or whip, of the teeth in moving from a relatively inclined position to a direction normal to the carrying means for the teeth or inclined forwardly somewhat from that position. My present invention embodies also a novel arrangement of the pickup teeth in the rotating drum so that stones which may be encountered in the field will be disposed of with a minimum amount of travel relatively to the machine. In the case of stones occurring near the middle of the pickup mechanism, such stones are moved to one end or the other of the pickup mechanism, depending upon their location relatively to the middle point of the pickup. This is accomplished by the novel arrangement of the pickup teeth with relation to the cylinder, as illustrated more clearly in Fig. 9 of the drawings. Because of the novel mode of spiraling of the teeth there is always a constant number of teeth in contact with the ground and, consequently, a constant resistance to the driving action of the machine. The tendency of the machine to have an intermittent jerking motion is therefore reduced to a minimum.

There are various kinds of dense vegetable matters which remain undetached from the ground during the cutting action, such as Russian thistle and cactus, etc., and when grain is laid in windrows on such a foundation it cannot be picked up by flexible teeth sloping backwardly as is the present custom with most machines. However, by having stiff teeth and causing them to dig into the vegetable matter, the grain can be picked up from such a foundation and carried to the conveyor to be carried to the threshing machine or other mechanism by which the grain is to be handled.

Among the objects of my invention are, therefore, to provide an improved mechanism for picking up detached grain and transferring it to another point to be further handled by another mechanism; to provide an improved mechanism for the handling of either loose or bundled grain; to provide a mechanism for the purpose indicated which will be of light weight and yet will be strong and efficient for the purpose intended; to provide in a mechanism of the character stated means for keeping the pickup mechanism from digging into the earth of the field to an unnecessary depth; to provide in connection with a mechanism of the character indicated means for minimizing the loss of loose grain; to provide a mechanism of the character indicated which can be easily adapted for use with any one of various machines already on the market; to provide a structure of the character indicated which will reduce to a minimum the number of stones delivered to the grain conveying mechanism; to provide a machine which will have as nearly as possible a constant contact resistance between the machine and the earth's surface; and such further objects, advantages, and capabilities as will hereafter appear and as are inherent in the construction disclosed herein. My invention further resides in the combination, construction and arrangement of parts illustrated in the accompanying drawings, and, while I have shown therein what is now considered the preferred embodiment of my invention, I desire the same to be understood as illustrative only and not to be construed in a limiting sense.

Figure 6:
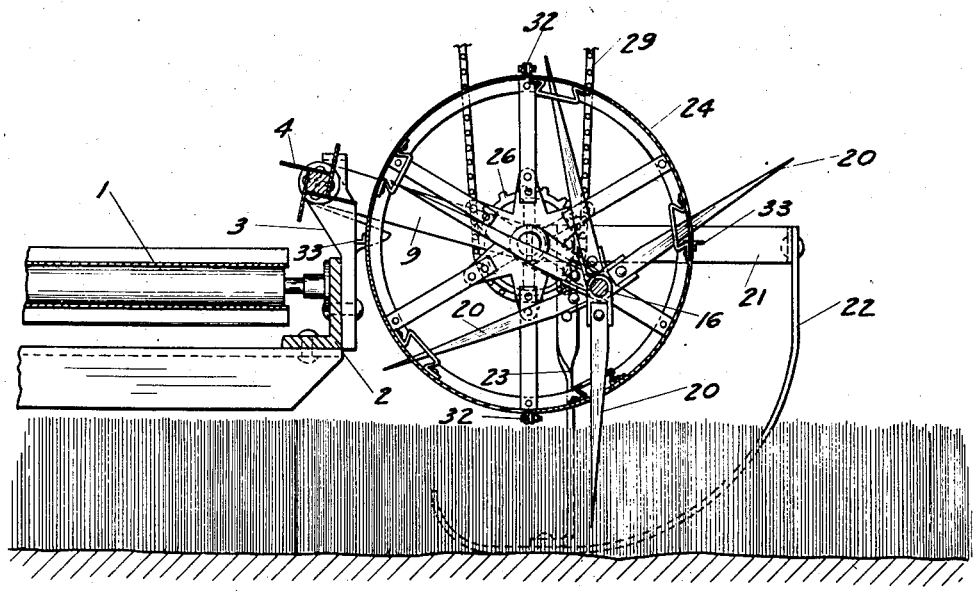

In the drawings annexed hereto and forming a part hereof, Fig. 1 shows my improved device in plan view and a portion of a conveyor to which the same is attached; Fig. 2 is an end elevation of the structure shown in Fig. 1, the same being taken from the left side of this figure; Fig. 3 is a fragmentary plan and section of a portion of the structure shown in Fig. 1 to show the mounting of the rotatable elements; Fig. 4 is an enlarged fragmentary vertical section to illustrate the means for limiting the upward and downward pivotal motion of the cylinder, the same being taken in the plane of the shaft about which the cylinder and its supporting mechanism oscillate; Fig. 5 is a diagram to illustrate the arrangement of the perforations in the cylinder for the pickup teeth, the same being shown as if the cylinder were opened along one of its joints and spread out flat; Fig. 6 is a transverse vertical section through the pickup cylinder, the same being taken substantially along the plane of the line 6—6, Fig. 1.

Referring more in detail to the annexed drawings, the conveyor platform of the machine with which my new pickup is used is denoted by the numeral 1, said platform, as is customary, including an apron having transverse raddles secured thereto. To the forward frame element 2 of this platform are connected brackets 3 which extend upwardly to furnish a support above the platform for the grain saving fan or beater 4 which takes loose heads of grain delivered by the cylinder and throws them to the apron to be carried thereby with the grain which is attached to the straw. The fan or beater 4 has a peripheral velocity equal to or greater than the peripheral velocity of the main cylinder or pickup drum and therefore catches all of the loose grain delivered by the latter during its rotation. The bracket 3 has an opening therein in which are mounted roller bearings 5 whose purpose is to reduce the friction of the shaft 6 upon which the beater 4 is mounted. On the end of this shaft is mounted a gear or sprocket wheel 7 which cooperates with the chain 8 which is driven from the shaft of the cylinder as will be explained more fully hereinafter. A bracket arm 9 has a head 10 which is hollowed out to form a bearing which cooperates with a portion 11 of the bracket 3, as illustrated clearly in Fig. 4. A lug 12 is formed upon the bracket 3 and is engaged by the upper surface of the arm 9 when the latter is turned about its pivotal connection with the bracket 3. This engagement limits the upward movement of the arm 9 so that the cylinder will not be raised unduly far. A corresponding bracket 13 limits the amount of downward movement which the arm 9 can make. These stops 12 and 13 occur at both sides of the cylinder so that there will not be undue strain upon either side of the machine.

An arm 14, offset laterally as indicated at 15, is secured to the arm 9 and, at its opposite end, is perforated for the reception of the shaft 16. The arm 14 and shaft 16 are rigidly secured together as by a pin 17, shown in Fig. 3. The shaft 16 is also shown as pinned to the bracket arm 18 carrying the shaft 19 which serves as a crank about which the teeth 20 travel as indicated in my prior applications referred to above. In view of the fact that the internal construction of the cylinder and crank and the mounting of the teeth 20 thereon is completely disclosed in the aforesaid applications, it is not considered necessary to give same in detail herein. It might be stated, however, that the teeth, as the cylinder is rotated, are projected through the wall thereof, picking up the grain and carrying it over the cylinder to be deposited upon the apron, the teeth being then withdrawn into the cylinder as indicated in Fig. 6. A further difference between the present construction and my prior construction is the novel arrangement of the teeth relatively to the drum. This arrangement will be given more in detail hereinafter and with more particular reference to Fig. 5 of the drawings.

Arm 9 is extended forwardly from shaft 16 as arm 21 and is attached to a shoe 22 which is also attached to an arm 23, adjustably connected to the arm 21. By means of this adjustment the height of the drum or cylinder 24 above the ground may be adjusted so as to secure the desired clearance between the teeth 20 and the ground. The shoe 22 rides along the ground and holds the drum spaced therefrom so as to prevent the teeth from digging into the soil to an undesired extent.

A sprocket wheel 26 is keyed or splined to a hollow hub 27 which has a bearing in the arm 9, the hub 27 having a flange 28 to which the drum is secured. This construction is duplicated at the two ends of the drum. At one end of the drum the sprocket wheel 26 cooperates with the chain 8 in the driving of the beater 4. At the other end of the drum or cylinder 24 sprocket 26 is driven by a chain 29 which passes over a suitable sprocket wheel not shown in the drawings, the latter sprocket wheel being driven from any suitable part of the machine. It will therefore be apparent that as the chain 29 is driven the drum 24 will be rotated and will cause rotation of sprocket wheels 26 and 7, thus causing rotation of the beater 4. It is therefore obvious that the drum 24 and beater 4 rotate simultaneously though not necessarily at the same speed. It will be obvious that the arms 14 prevent the shaft 16 from turning and thus hold the arms 18 and the crank 19 in definite position. This position should be such that the teeth 20 will be projected downwardly to engage the grain and carry the same over the top of the drum as this rotates. Also, these teeth should be withdrawn through the surface of the drum as they approach the discharge position near the beater 4. This action is shown clearly in Fig. 6.

The drum 24 is shown as composed of two sections 30 and 31 each of which is flanged along two edges as indicated at 32. These sections have angle shaped ribs 33 arranged midway between the flanges 32 and the drum is therefore provided with four longitudinal ribs which carry the loose grain forwardly and discharge it on to the beater 4.

As is evident from Fig. 5, the teeth 20, projecting through the holes 34 in the drum, will have the same staggered arrangement that these holes have. Therefore, if a stone or other loose obstruction is struck by the teeth between the middle and one end of the drum, the tendency of the teeth will be to work this outwardly toward the nearer end. If such obstruction is struck by one of the teeth near the middle of the drum it may move either to the right or left, eventually being discharged at an end of the drum. The purpose of this is to avoid having such an obstruction pass substantially the entire length of the drum, as might happen if the teeth were arranged spirally around the drum as indicated in my application Serial No. 374,545, referred to above. It is believed this arrangement is quite an improvement over the arrangement of the prior application.

In Fig. 5 certain of the perforations 34 are designated as 34$a$, 34$b$, 34$c$, 34$d$, 34$e$, and 34$f$. The letters attached to the numeral 34 indicate the arrangement of the teeth on the crank shaft 16, that is, the tooth which passes through opening 34$b$ is arranged on shaft 16 next to the tooth which passes through opening 34$a$. Likewise, the tooth which passes through opening 34$c$ is arranged next to the tooth which passes through opening 34$b$ and so on. It will be noted that there is a jump of more than one-half the peripheral distance around the cylinder from the openings 34$a$ to the openings 34$b$ and then a backward jump on the periphery of the cylinder from 34$b$ to 34$c$. This is followed by another long forward step from 34$c$ to 34$d$, followed, in turn, by the backward step from 34$d$ to 34$e$ and the forward from 34$e$ to 34$f$. Inasmuch as the length of the hubs of the teeth 20 is approximately three quarters of an inch, the distance longitudinally of the cylinder or drum between a plane passing centrally through the opening 34$a$ and perpendicular to the axis of the drum to a similar plane passing through the opening 34c will be approximately 1½ inches. There will be a similar relationship between the planes passing through the openings 34b and 34d and between 34e and 34f. Therefore, the tendency is to have each row of teeth pass approximately one-half way between the previous row and the following row as they pass over the surface of the ground, thus reducing the likelihood of leaving any grain lying on the surface of the ground.

As indicated in Fig. 6, the flanges 32 of the drum or cylinder 24 are bolted together at intervals so as to secure a rigid construction but one which may, if necessary, be opened up for the making of repairs. This construction also simplifies the work of assembly of the drum.

It will be seen from the foregoing disclosure that I have produced a device which will accomplish the objects set forth above.

While I prefer to use rigid teeth in this mechanism, it is obvious that resilient teeth might be used instead. For example wire teeth, either straight or curved or having a coil near the pivot end thereof might be substituted for the teeth shown herein.

It is of course understood that the specific description of structure set forth herein may be departed from without departing from the spirit of this invention as set forth in the appended claims.

Having now described my invention, I claim:

1. A structure for the purpose indicated comprising a rotary drum having pickup teeth, means to mount said drum in connection with transporting means, and means to maintain the drum at a given fixed distance above the earth's surface, said pick-up teeth being arranged in spiral rows along the drum surface.

2. In a structure for the purpose indicated, a rotary pickup mechanism operating in close proximity to the ground for picking up grain from the ground and constructed for support in connection with a transporting mechanism, said pickup mechanism having a rotary drum, means for supporting the drum upon the transporting mechanism, rotary means adjacent the drum, having longitudinal blades, to receive loose grain from the pickup mechanism and deliver it to the transporting mechanism, and driving connections for the drum and said rotary means.

3. In a structure for the purpose indicated, a rotary pickup mechanism for support in connection with a transporting mechanism, means for supporting the drum upon the transporting mechanism, rotary means adjacent the drum to receive loose grain from the pickup mechanism and deliver it to the transporting mechanism, and driving connections for the drum and said rotary means, said drum being pivotally mounted for vertical movement relatively to the transporting means and having means for supporting the same at various distances above the surface over which it is being transported.

4. In a structure for the purpose indicated, a cylinder mounted for rotation about a substantially horizontal axis, arms supporting the cylinder for rotation about said axis, brackets by means of which the arms may be mounted upon and secured to a transporting means, shoes to sustain said arms at a definite but adjustable distance from the surface over which the machine is being transported, said cylinder having external ribs to carry loose grain along and deliver same to a handling means, and grain handling means to receive the grain from the rotary cylinder and transfer it along its course.

5. In a rotary pickup mechanism, a cylinder formed from two partially cylindrical elements flanged at their longitudinal edges and said flanges secured together, angle-irons extending longitudinally of the cylinder and mounted upon the exterior surface thereof between said flanges, and teeth mounted upon an axis located within the cylinder and eccentrically with relation to the cylinder axis, said teeth extending through apertures in the cylinder and being capable of projecting through the wall of the cylinder or withdrawing into same.

6. A structure as defined by claim 5 in which the apertures through the wall of the cylinder, through which the teeth project, are arranged in substantially spiral rows along the length of the cylinder from approximately its mid-point toward the two ends thereof, the two ends of the rows receding from said substantially central point in the opposite direction from the direction of rotation of the cylinder.

7. In a rotary grain pickup mechanism, a cylinder provided in its cylindrical walls with perforations for the reception of pick-up teeth, pickup teeth mounted in the cylinder to be projected through the perforations in the cylinder wall and withdrawn within the cylinder, the perforations being arranged in substantially spiral rows extending from approximately the midpoint in the length of the cylinder toward each end thereof, the rows receding from said mid-point in the same direction from a line extending longitudinally of the cylinder.

8. A cylinder for a rotary pickup device having perforations through the cylindrical wall thereof for the extension and retraction of pickup teeth, the perforations through the wall of the cylinder being arranged in substantially spiral rows extending from approximately midway of the length of the cylinder to its two ends.

9. In a pickup mechanism of the character stated, a rotary cylinder having therein an axis offset with relation to the axis of the cylinder, said offset axis being held in definite fixed relation to the cylinder axis, said cylinder having series of perforations through the cylindrical surface thereof and said offset axis carrying teeth which project through the perforations of the cylinder, adjacent teeth on the axis being mounted to extend through non-adjacent perforations in the cylinder wall.

10. A rotary pickup mechanism for the purpose indicated, comprising a relatively fixed axis, a cylinder rotatable about said axis, arms within the cylinder extending transversely of the axis, a second axis carried by said arms and held in definite fixed position with relation to the first axis, teeth mounted on said second axis for projection through the cylindrical wall of the cylinder, said cylinder having perforations through its cylindrical wall through which the teeth may be reciprocated to be projected a greater or less distance outside of the cylinder wall, adjacent teeth on the axis extending through non-consecutive openings in the cylinder wall and having a definite regular order of non-consecutive projection so that cylinder teeth will cover the ground closely.

11. A structure as defined by claim 9 in which the cylinder is provided upon its external surface with a plurality of longitudinally extending ribs.

12. A structure as defined by claim 10 having means for causing rotation of the cylinder and thereby causing projection and retraction of the teeth through the wall of the cylinder.

13. A structure as defined by claim 9 having in combination with the cylinder and mounted adjacent thereto a fan for rotation in the same direction as the cylinder and at approximately the same peripheral speed.

14. In a pickup mechanism of the character stated, a rotary cylinder having therein an axis offset with relation to the axis of the cylinder, said offset axis being held in definite fixed relation to the cylinder axis, said cylinder having series of perforations through the cylindrical surface thereof and said offset axis carrying teeth which project through the perforations of the cylinder, adjacent teeth on the axis being mounted to extend through non-adjacent perforations in the cylinder wall, and a fan for rotation in the same direction as the cylinder and at approximately the same peripheral speed, the cylinder having longitudinally extending ribs on its periphery projecting outwardly and serving as means to deliver loose grain to the fan.

In witness whereof, I hereunto subscribe my name to this specification.

GEORGE INNES.